Sept. 6, 1938.  D. H. McGOGY  2,129,066
THERMOSTATICALLY CONTROLLED VARIABLE SPEED DEVICE
Filed June 2, 1936  4 Sheets-Sheet 1

Inventor:
Donald H. McGogy
by J. Geisler
Attorney.

Sept. 6, 1938. D. H. McGOGY 2,129,066
THERMOSTATICALLY CONTROLLED VARIABLE SPEED DEVICE
Filed June 2, 1936 4 Sheets-Sheet 2
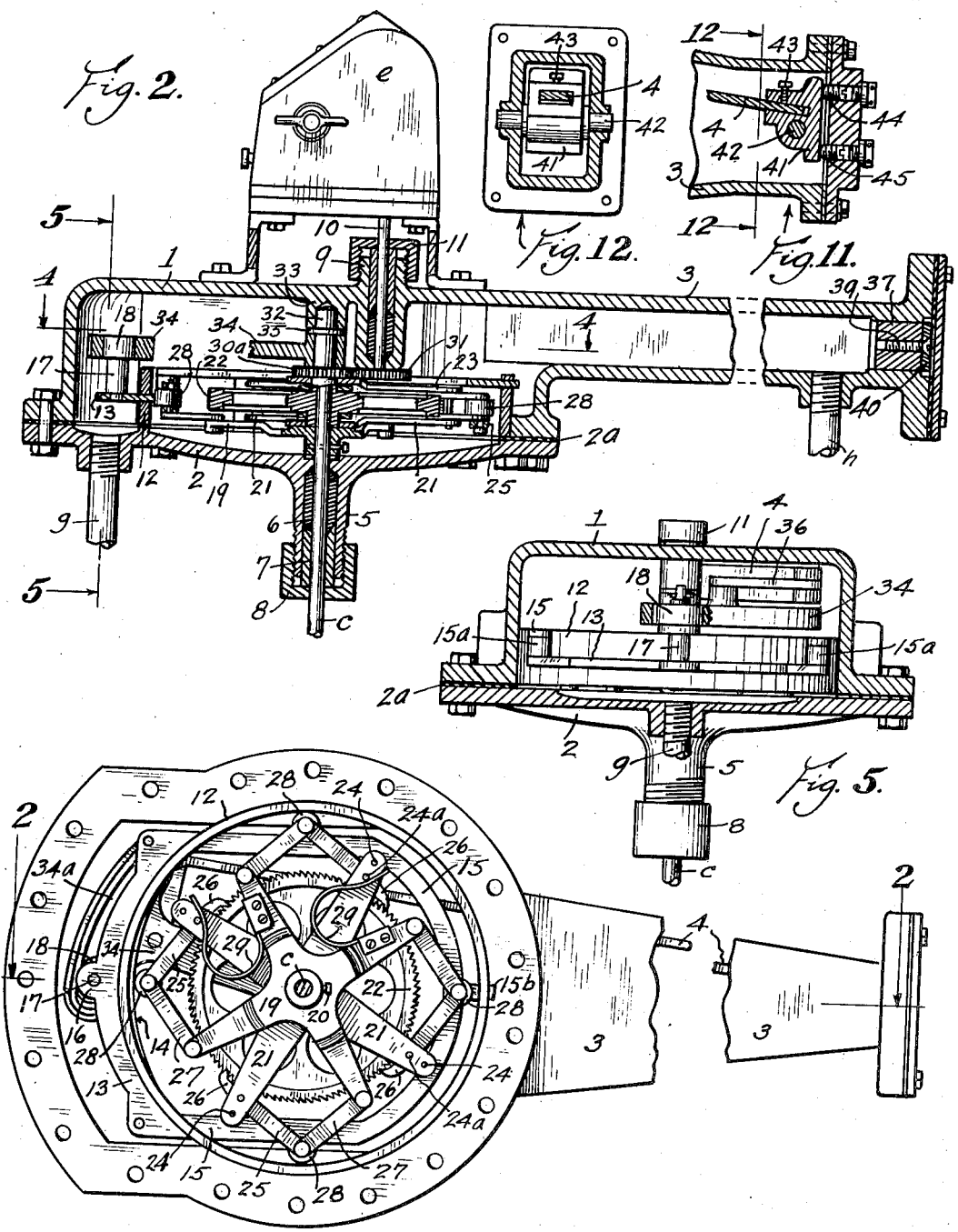
Inventor:
Donald H. McGogy
by J. J. Geisler
Attorney Sept. 6, 1938.  D. H. McGOGY  2,129,066
THERMOSTATICALLY CONTROLLED VARIABLE SPEED DEVICE
Filed June 2, 1936  4 Sheets-Sheet 3
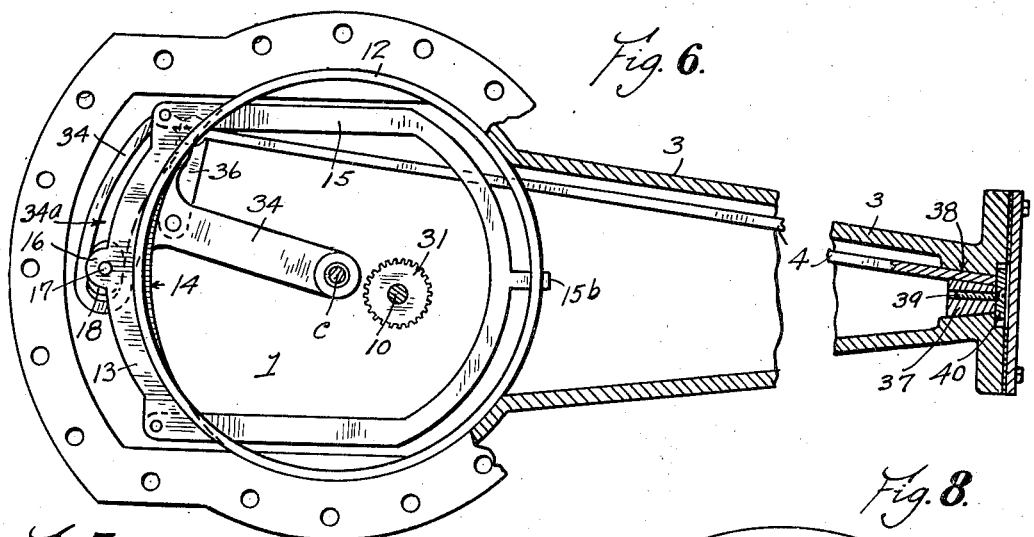
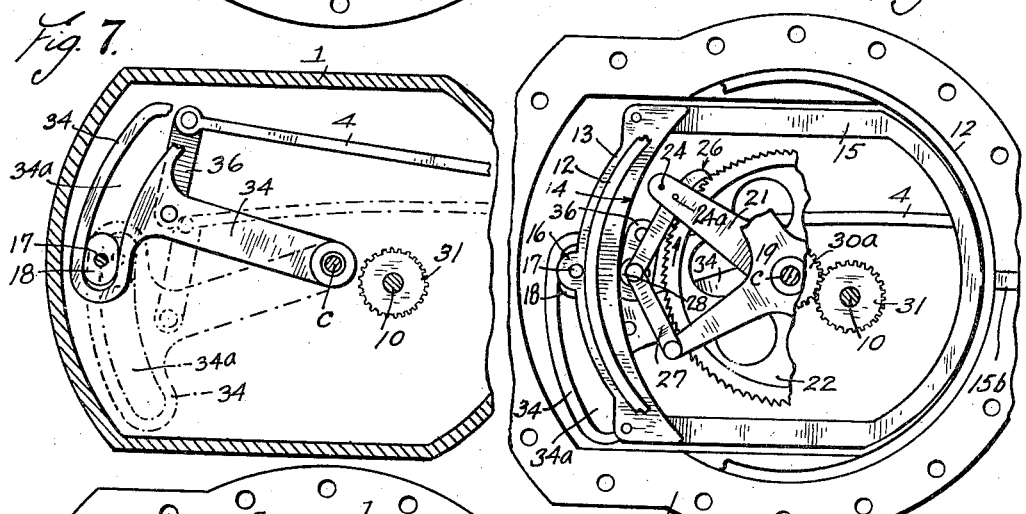
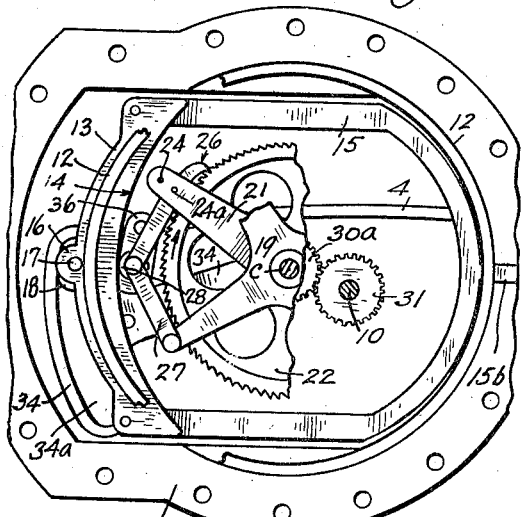
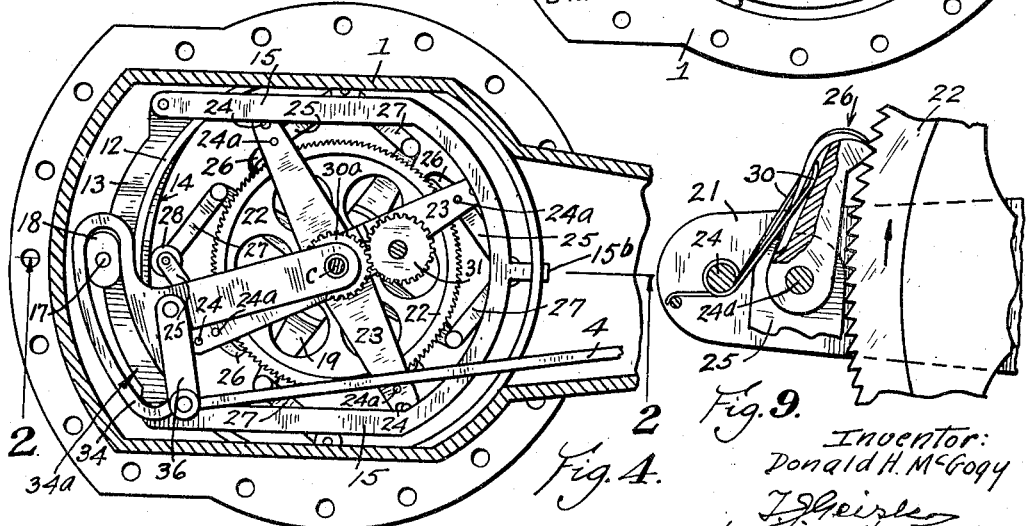
Inventor:
Donald H. McGogy
by T.J.Geisler
Attorney Sept. 6, 1938.  D. H. McGOGY  2,129,066
THERMOSTATICALLY CONTROLLED VARIABLE SPEED DEVICE
Filed June 2, 1936  4 Sheets-Sheet 4

Inventor:
Donald H. McGogy

Patented Sept. 6, 1938

2,129,066

UNITED STATES PATENT OFFICE 2,129,066

THERMOSTATICALLY CONTROLLED VARIABLE SPEED DEVICE

Donald H. McGogy, McMinnville, Oreg.

Application June 2, 1936, Serial No. 83,085

1 Claim. (Cl. 74—113)

My invention is intended to be used particularly in meters for measuring fluids flowing thru pipes, for example gasoline or oil, where it is necessary to provide correction means to eliminate inaccuracies occasioned by temperature variations.

It is well known that variations in temperature cause variations in volume and density of fluids; that, for instance, the volume of oil, gasoline, etc., expands with heat, the amount of expansion differing with different fluids. Thus in the handling of large volumes of oil or gasoline it is customary, after measuring actual volume, to figure correction based on mathematical calculation according to the temperature.

The principal object of my invention is to provide a thermostatically controlled variable speed device for adjusting the speed of operation of the registering mechanism of a fluid meter which will permit such mechanism to be speeded up or retarded to correspond with temperature variations in the fluid being metered; whereby, with the passage of fluid thru a meter of fixed volume, the registering mechanism will move more slowly in relation to the meter for higher temperatures and more rapidly in relation to the meter at lower temperatures, and thus cause the equivalent of a standard measure at a predetermined mean temperature to be accurately delivered regardless of temperature variations.

Another object of my invention is to provide an adjustment mechanism of the type indicated in such form as to be suitable as an attachment for standard types of fluid meters now in use, thus making it unnecessary to build special meters for the utilization of my correcting device.

Another object of my invention is to provide such a device which will be simple, durable and comparatively low in cost.

Another object is to provide such a device which can be accommodated to a wide range of temperature and particularly to very high temperatures for use in measuring fluids in chemical manufacturing plants, refineries, etc.

These and other objects I attain by constructing and employing my variable speed device in the manner now to be described with reference to the accompanying drawings, in which:

Fig. 2 (Sheet 2) shows a vertical longitudinal section through the center of my device taken approximately on the lines 2—2 of Figs. 3 and 4, with certain parts broken away;

Fig. 3 (Sheet 2) is a bottom plan view with the lower portion of the housing of my device removed in order to show the arrangement of the mechanism of my device as viewed from the bottom;

Fig. 4 (Sheet 3) shows a horizontal section taken on the line 4—4 of Fig. 2 looking down, and shows a top plan view of the interior mechanism corresponding to the bottom plan view of Fig. 3;

Fig. 5 (Sheet 2) shows a vertical transverse section on the line 5—5 of Fig. 2, looking in the direction indicated by the arrows;

Fig. 6 (Sheet 3) shows a bottom plan view similar to Fig. 3, but with part of the interior mechanism removed to show the thermostatic element more clearly, and with a portion of the housing about the thermostatic element broken away;

Fig. 7 (Sheet 3) shows a fragmentary detail of the thermostatic element shown in Fig. 6, and illustrates by broken lines the action of the thermostatic element under temperature changes;

Fig. 8 (Sheet 3) shows a fragmentary bottom plan view of a portion of the interior of my device corresponding to Fig. 3 but with the thermostatic element moved to the position indicated by the broken lines in Fig. 7, thus showing the effect of a change of position of the thermostatic element on the working of the mechanism composing my device;

Fig. 9 (Sheet 3) shows an enlarged fragmentary view of one of the pawls of the groups of multiple pawls used in my device;

Fig. 11 (Sheet 2) shows a sectional view of a modification of the means of anchoring the end of the bi-metallic thermostatic strip used in my device;

Fig. 12 (Sheet 2) shows a transverse section on the line 12—12 of Fig. 11; and

Figure 1:
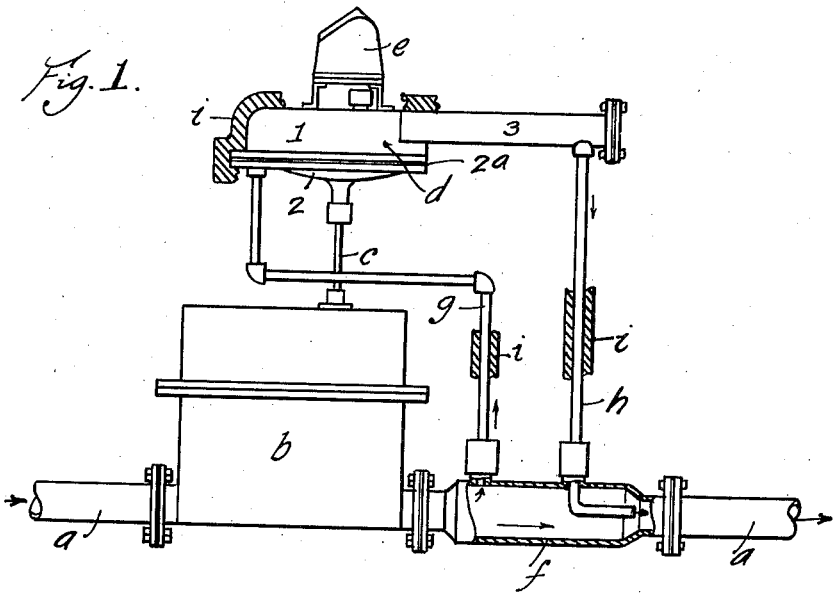
Fig. 1 shows a side elevation of my device connected to a meter and to the pipe through which the metered fluid flows, the drawings being more or less diagrammatic, with parts broken away and shown in section.

Referring first to Fig. 1, $a$ indicates the pipe through which the fluid being metered passes, and $b$ indicates a standard meter, such as at present used for metering fluids or liquids. The passage of the fluid through the meter $b$ causes a vertical shaft $c$, included in the meter, to be rotated. The shaft $c$ is connected, through the medium of my device, which device is indicated as a whole by $d$ in Fig. 1, to the shaft of a standard registering apparatus (such as is standard at present) indicated by $e$. The delivery pipe $a$ is provided with an enlarged section $f$, and pipes $g$ and $h$ connect section $f$ with my device so that, with the flow of the fluid through pipe $a$, a portion of the fluid will constantly be drawn through my device by a suction action, as indicated by the arrows in Fig. 1. My device and the connecting pipes $g$ and $h$ are preferably covered with suitable insulation, indicated in section by $i$, to insure that the portion of the metered fluid passing through my device will be at the same temperature as that passing through pipe $a$.

Referring now to Figs. 1, 2 and 5, my device, designated by $d$, is enclosed in a housing comprising an upper section 1, and a bottom plate 2 which is bolted to the upper section; a tight seal between the two sections being obtained by means of the gasket 2a. The upper section 1 has an elongate lateral portion 3 to accommodate the stem of the bi-metallic thermostatic strip 4 which is an important element in my invention.

The bottom plate 2 of the housing is made with an external, centrally located gland 5 through which the shaft $c$ of the meter extends. The gland has standard packing gland elements 6 and 7, and the lower end of the gland 5 has threaded thereon an adjustable cap 8, which serves to hold the packing gland elements 6 and 7 in place.

The upper section 1 of the housing is provided with a gland 9 through which the vertical shaft 10 extends, which shaft is connected to the registering apparatus $e$. The gland 9, similarly to gland 5, is provided with packing gland elements, and a cap 11. The registering apparatus $e$ is secured by suitable means to the top of my device, as indicated in Figs. 1 and 2.

Within the housing section 1 a circular track 12 is rigidly attached concentric with the axis of rotation of shaft $c$ (see Figs. 2, 3, 4 and 5). This circular track 12 has a slot along its median line extending part way around the track and adapted to accommodate a sliding plate or bridge 13. The inner edge 14 of this sliding bridge 13 constitutes an arc of greater radius than that of the circular track 12 and provides an adjustable cam surface. The ends of the sliding bridge 13 are attached to a U-shaped horizontally sliding member or yoke 15 having a lug 15b adapted to slide in a slot provided in the circular track 12, the ends of the sliding bridge 13 being connected to the yoke 15 by means of spacers 15a. The outer edge of the sliding bridge 13 is provided with an ear 16 having a vertical stud 17. On the upper end of this stud 17 a slide block 18 is pivotally mounted, which block bears in a slotted pivoted cam arm 34, later described.

Figure 13:
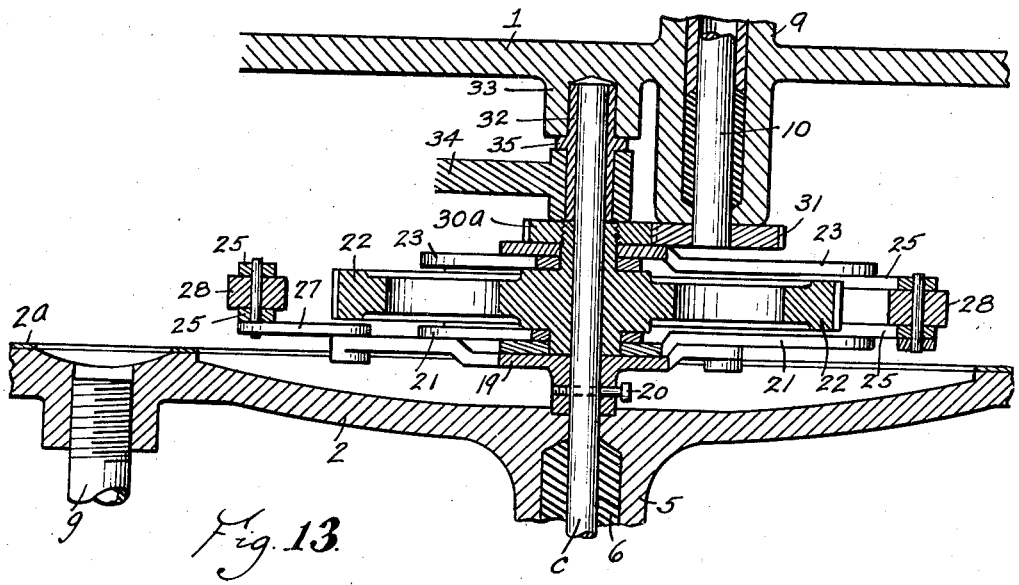
Fig. 13 (Sheet 4) shows a fragmentary vertical longitudinal section taken on the same line as the section shown by Fig. 2, but drawn on a larger scale than Fig. 2 to indicate the individual elements more clearly.

On the meter shaft $c$ a 4-arm spider 19 is rigidly mounted by means of set screw 20. Above the spider 19 are rotatably mounted, on the shaft $c$, a pair of lower cross-arms 21, a ratchet wheel 22, and a second pair of upper cross-arms 23, respectively. (See Figs. 3, 4 and 13.) The two cross-arms 21 cross each other approximately at right angles but may be given partial rotation independent of each other on the shaft $c$. The ends of the lower and upper cross-arms 21 and 23, respectively extending below and above the ratchet wheel 22 are secured together by means of shouldered pins 24, the two cross-arms 23 corresponding to and being arranged similarly to the cross-arms 21. The cross-arms 21 and 23 are further provided with pins 24a pivotally supporting pairs of links 25 and groups of pawls 26. (See Figs. 3, 4 and 10.)

Each of the arms of the spider 19 has connected to its outer end a pivoted link 27, which link in turn is pivotally connected to one of the pairs of links 25, and a roller 28 mounted between said links. The rollers 28 travel on the inner surface of the circular track 12, and the inner edge 14 of the slidable bridge 13. Leaf springs 29 are provided between the spider 19 and the lower pair of cross-arms 21, as shown in Fig. 3, by which leaf springs the rollers 28 are held under tension against the circular track 12 and bridge 13.

Figure 10:
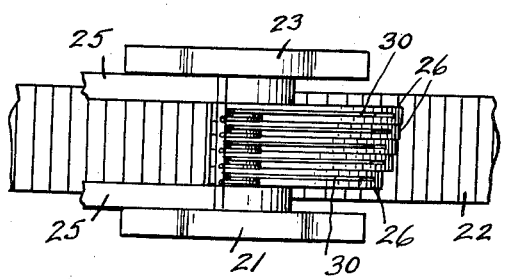
Fig. 10 (Sheet 4) shows a top view of one of the said groups of pawls.

Each of the groups of pawls 26 is made up of individual pawls of different lengths, as shown more clearly in Fig. 10 (Sheet 4) so that one of the pawls of each group will always engage one of the teeth of the ratchet wheel 22. Providing several pawls of different lengths accomplishes the same result as having finer teeth on the perimeter of ratchet wheel 22, but is more practical. Springs 30 (see Figs. 9 and 10) hold the pawls against the ratchet wheel 22.

As apparent from Fig. 3, when the inner cam edge 14 of the sliding bridge 13 does not project beyond the inner surface of circular track 12, the rotation of spider 19 will cause the rollers 28 to travel around on the track 12, thus causing the ratchet wheel 22 to be rotated at the same speed as the spider 19; one of the pawls 26 of each of the four groups of pawls engaging the teeth of the ratchet wheel 22. But when the cam edge 14 of the sliding bridge 13 projects beyond the inner surface of the track 12, as shown in Fig. 3, then each roller 28, as it comes into contact with the cam edge 14 of the bridge 13, will be forced inward toward the common axis of rotation of spider 19, ratchet wheel 22, and lower and upper cross-arms 21 and 23, and such inward movement of the rollers 28, by increasing the angle between the connecting links 25 and 27, will cause the respective cross-arms 21 and 23 to be moved ahead of the corresponding arm of spider 19; and the pawls carried by the ends of said cross-arms will in turn move ratchet wheel 22 slightly ahead. This occurs repeatedly as each roller 28 passes over the cam edge 14 of the bridge 13; and the amount of such increments in speed of rotation given to the ratchet wheel 22, in comparison with the speed of rotation of spider 19, will depend upon the extent to which the cam edge 14 of bridge 13 projects beyond the inner surface of circular track 12. Thus by adjustment of sliding bridge 13, ratchet wheel 22 can be caused to rotate at the same speed as spider 19, or at a greater speed than spider 19.

On the upper hub of ratchet wheel 22 is rigidly mounted a gear 30a (see Fig. 13, Sheet 4), meshing with a gear 31 rigidly mounted on the shaft 10 of the registering apparatus $e$. Thus the rotation of ratchet wheel 22 causes the rotation of the shaft 10, and the operation of the registering apparatus $e$.

The upper end of shaft $c$ is journaled in a sleeve bearing 32 mounted in a socket 33 on the interior of housing 1. The sleeve bearing 32 is made with annular flange 35, and below said flange the cam arm 34 is rotatably mounted on the sleeve bearing 32. (See Figs. 2 and 13.) The cam arm 34 is shown more clearly in Figs. 4, 6 and 7. The outer end of said cam arm 34 has a curved head provided with a slot 34a in which bears the slide block 18; the curvature of slot 34a being such that movement of the cam arm 34 will cause the slide block 18, and with it the bridge 13, to be moved lineally in and out, with respect to axis of rotation of the shaft c. A pivoted link 36 connects cam arm 34 to the free end of the bi-metallic thermostatic strip 4. The other end of the thermostatic strip 4 is anchored in the outer end of the elongate section 3 of the housing 1 of my device. (See Figs. 2 and 6.) Temperature changes of the fluid passing thru pipe g into the housing of my device, and thence out thru pipe h will cause changes in the curvature of the bi-metallic thermostatic strip 4, and such change in the curvature of strip 4 will cause a movement of the cam arm 34, which in turn will cause a change in the position of sliding bridge 13 in the manner already explained.

The operation of my device is as follows: For convenience, for ordinary purposes, I make the gear 31 with 4% more teeth than the gear 30a with which it meshes; that is to say, the meshing gears 30a and 31 are so arranged that shaft 10 of the registering mechanism e will be rotated at 4% less speed than ratchet wheel 22. When taking 60° F. as the standard mean temperature at which the fluid is to be metered, the bi-metallic thermostatic strip 4 and the connecting parts are so set that the position of the cam arm 34 and sliding bridge 13 will cause the ratchet wheel 22 to be driven with a speed increment approximately 4% greater than the spider 19, and meter shaft c. Thus at 60° F. temperature the shaft c and the shaft 10 would be rotated at approximately the same speed, since the increment in speed of the ratchet wheel 22 at that temperature will be exactly offset by the loss in speed between gears 30a and 31. The thermostatic strip 4 at lower temperatures will then cause the sliding bridge 13 to be projected further into the inner surface of track 12; and similarly, higher temperatures than 60° F. will cause the bridge 13 to be moved outward until, at the highest temperature for which my device would make corrections, the bridge 13 will no longer project into the track 12 at all. In other words, as the temperature of the fluid passing thru my device rises above 60° F., the speed of shaft 10 with relation to that of shaft c will be decreased, and as the temperature of the metered fluid falls below 60° F. the speed of shaft 10 will be increased. Thus an automatic micrometer adjustment of the registering device e is obtained corresponding with the temperature fluctuation of the fluid being metered. Due to the very slight load imposed upon the bi-metallic thermostatic strip 4, and to the fine adjustments made possible by the multiple pawl elements, a very high degree of accuracy is obtainable for even slight fluctuations in temperature.

While I have described my device as being set for a mean temperature of 60° F., it is obvious that it could be set for any other mean temperature by altering the anchored position of the thermostatic strip 4, and, furthermore, that the range of temperature covered can be altered by changing the composition and form of my thermostatic strip. For ordinary purposes, however, I have found that a standard type of bi-metallic thermostatic strip, which is readily obtainable, produces satisfactory results and is suitable for ordinary use in my device as described.

Figs. 2 and 6 show the means by which the bi-metallic thermostatic strip 4 is anchored in the end of the elongate housing section 3. A wedge-shaped block 37 holds the end of the strip 4 firmly against the abutment 38 of one of the converging walls of the housing, and the block 37 is held in position by means of a screw 39 passing through an end plate 40 which rests on shoulders provided in a recess of the housing walls. Figs. 11 and 12 show a modified means of attaching the end of a thermostatic strip 4. In the modified construction illustrated in these figures, a block 41 is pivotally supported in the housing walls by a pin 42. The end of the thermostatic strip 4 is inserted in a slot in block 41, and is clamped therein by means of a screw 43. The position of the block 41, and therewith the position of the end of the thermostatic strip 4, is determined by two screws 44 and 45 extending thru a plate at the end of the housing. Tightening one of these two screws and loosening the other will cause the block 41 to be tilted on pin 42. This modified means of supporting the thermostatic strip 4 is particularly convenient in cases where my device is to be used for different mean temperatures, for example, in chemical manufacturing plants where different fluids are to be metered and temperature corrections made in the metering on the basis of different mean temperatures. This means could also be used in place of the manual adjustment means provided in fluid meters.

I claim:

In a variable speed transmission of the type described having a rotating shaft, an arm rigidly mounted on said shaft, a second arm rotatably mounted on said shaft, articulated links connecting the extremities of said arms, a ratchet wheel mounted on said shaft and a pawl carried by said second arm engaging said ratchet wheel, a stationary curved track concentric with said shaft, a guide roller carried by said links and adapted to roll on said track, a slot in said track, a slidable bridge located in said slot, the inner edge of said bridge constituting an arc of greater radius than said track, thereby providing a cam surface when said bridge is projected within said track, and thermostatically controlled means for positioning said bridge and therewith said cam surface.

DONALD H. McGOGY.